United States Patent [19]

Vollmayr

[11] Patent Number: 5,003,484
[45] Date of Patent: Mar. 26, 1991

[54] DUPLICATING ARRANGEMENT

[75] Inventor: Norbert Vollmayr, Traunwalchen, Fed. Rep. of Germany

[73] Assignee: Dr. Johannes Heidenhain GmbH, Traunreut, Fed. Rep. of Germany

[21] Appl. No.: 306,981

[22] Filed: Feb. 6, 1989

[30] Foreign Application Priority Data

Feb. 16, 1988 [DE] Fed. Rep. of Germany ....... 3804743

[51] Int. Cl.5 .................... G05B 19/19; B23Q 35/04
[52] U.S. Cl. ........................ 364/474.03; 364/474.35; 409/99
[58] Field of Search ............. 364/474.03, 413.19, 364/474.24, 474.2, 474.28, 474.29, 474.35, 474.37; 356/376; 318/570, 578; 409/80, 93, 99

[56] References Cited

U.S. PATENT DOCUMENTS 4,603,285 7/1986 Matsuura et al. ................. 318/578
4,639,172 1/1987 Kishi et al. .......................... 409/80
4,704,686 11/1987 Aldinger ............................. 364/468
4,821,200 4/1989 Öberg .............................. 364/474.24

Primary Examiner—Jerry Smith
Assistant Examiner—Paul Gordon
Attorney, Agent, or Firm—Willian Brinks Olds Hofer Gilson & Lione

[57] ABSTRACT

A duplicating arrangement is provided for duplicating a workpiece. Data of the workpiece are obtained by scanning of a model, the data are then digitized and stored. The data which is obtained are transformed into NC sets. A relative tool correction consideration is performed in determining the control signals for the drives of the NC machine. The relative tool correction accounts for the generally variable dimensions of the scanning ball used in the scanning of the model and of the radius of the milling tool in the production of the workpiece. A correction movement is superposed on the relative movement between the milling tool and the workpiece if a collision consideration determines that contour surface parts are within the projection surface of the milling tool.

7 Claims, 5 Drawing Sheets

DUPLICATING ARRANGEMENT

BACKGROUND OF THE INVENTION

The present invention relates generally to an apparatus or arrangement for duplicating a workpiece by scanning of a model, obtaining data from the workpiece and storing the data and transforming the data into numerical control sets for the control signals for the drive of a numerically controlled milling machine. More particularly, the present invention is directed to an arrangement for duplicating a workpiece, which performs a collision test and applies a correction movement on the milling tool in response to the collision test.

The production of workpieces with spatially curved surfaces is among the most difficult of machining problems. There has been previous efforts to improve duplicating techniques for this purpose. However, since the general introduction of numerically controlled (NC) processing machines, not very much attention has been devoted to further develop the so-called copying milling machines Only recently has there been a regained interest in the duplication of spatial models, particularly through the use of NC-technology in machines for duplicating free form surfaces which are difficult to describe mathematically.

In order for NC-controlled copying milling machines to duplicate a workpiece, a model of the workpiece is scanned by means of a measuring sensor. The measurement data which are obtained in this manner are typically stored in the digital memory of the NC-control of the machine. This is generally referred to as "digitalization of spatial models". For example, such a digitalization process is described in EP-A1-227842. Since such a digitalization process is known in the art and is not an object of the present invention, no further details of the digitalization process are given here.

The physical spatial dimensions of the elements of the duplicating arrangement usually lead to inaccurate dimensional data. For example, data that are determined by a measuring sensor as dimensional data of the workpiece are inaccurate since the sensing arm includes a measuring sensor which has physical dimensions. For example, the scanning sensor generally includes a scanning ball which has physical spatial dimensions. The tool with which the surface of the workpiece is to be generated also includes physical dimensions. The dimensions of the tool do not generally correspond to the radius of the scanning ball of the measuring sensor. These differences along with the variations between the data received in the scanning direction and the processing or working-off of the data in the processing direction by the tool must be taken into account in processing the dimensional data obtained of the model.

NC-controlled duplicating machines which perform these functions are expensive since, in addition to the NC machine, a powerful personal computer including all of the corresponding peripheral equipment is required. Such an arrangement is described in a report in the periodical "Werkzeug and Formbau" June 1987, pages 79 and 80.

Therefore, in view of the above, it is a primary object of the present invention to provide an arrangement which uses a machine tool equipped with path control for the production of workpieces, which arrangement may be used to reproduced free formed surfaces.

SUMMARY OF THE INVENTION

To achieve the foregoing and other objects and in accordance with the purposes of the present invention the apparatus of the present invention for producing a workpiece having a desired correct workpiece surface may include a storage medium and a duplicating machine, wherein the duplicating machine includes a numerical control and a processing tool. Data which relates to the position and the dimensions of the workpiece and data which relates to the movement path and dimensions of the tool are deposited in a storage medium and stored as contour elements of a spatial matrix. The numerical control includes means for comparing the data relating to the workpiece and the tool and generates a control signal in response to the comparison. The control signal controls the positioning movements between the workpiece and the tool, which movements determine the surface form of the workpiece. Means are provided for performing a collision test which comprise means for projecting the surface of the tool onto the surface of the workpiece and comparing the height data of the contour elements of the tool with the height data of the workpiece within the projection surface of the tool. If the comparison of the height data indicates that in the path of movement of the tool, contour elements of the correct workpiece surface are higher than the contour elements which are to be momentarily generated by the tool without a correction factor, a correction movement is superposed on the positioning movements of the tool.

The present invention thus provides an apparatus in which a workpiece, which is duplicated by scanning a model, can be duplicated more precisely. More precise duplication is accomplished by taking into account the dimensions of the scanning ball and the radius of the milling tool.

Additional objects, advantages and novel features of the invention will be set forth in part in the description which follows, and in part will become apparent to those skilled in the art upon examination of the following or may be learned by practice of the invention. The objects and advantages of the invention may be obtained by means of the combinations particularly pointed out in the appended claims.

DETAILED DESCRIPTION OF THE PRESENTLY PREFERRED EMBODIMENT

Figure 1:
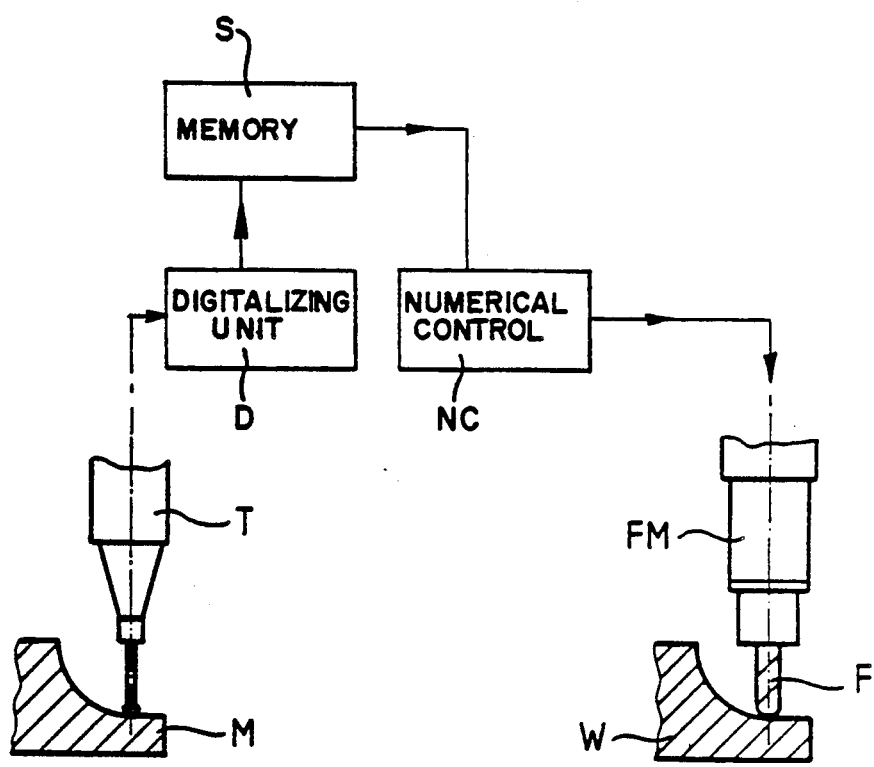
FIG. 1 illustrates a preferred arrangement according to the present invention in block circuit diagram form.

Referring now specifically to FIG. 1, an apparatus for the milling of free form surfaces is schematically illustrated. A sensor T scans a model M of a workpiece W in a known manner. From the scanning process data are obtained for the surface of the model M. The data obtained from the scanning process are converted in a digitalizing unit D and deposited in a digital memory S. The digital memory S can be any suitable arbitrary form. For example, for the NC milling machine described here it may be a diskette operating mechanism. From the diskette, the data are read out and fed to the NC-control. The NC-control in turn controls the milling tool F of the milling machine according to the converted data. This process produces a workpiece W with the same geometry as the model M, within the accuracy of the digitalization process.

Since the conversion of the model data into the NC-true control instructions occurs in the digitalizing unit D, the data may be numerically manipulated. Such a manipulation of the data may be advantageous if the workpiece W is to be produced in a size which deviates from a 1:1 scale or is to be otherwise geometrically distorted.

As an ideal case, it is possible to choose the sensor T and the milling tool F to have identical physical form and diameter. In such an arrangement, the path of the tool center is directly provided by storing the center-point path of the sensor T. Since an accurate path of the tool center is provided, the stored data can be used directly for the production of the workpiece W without any further manipulation.

Figure 2:
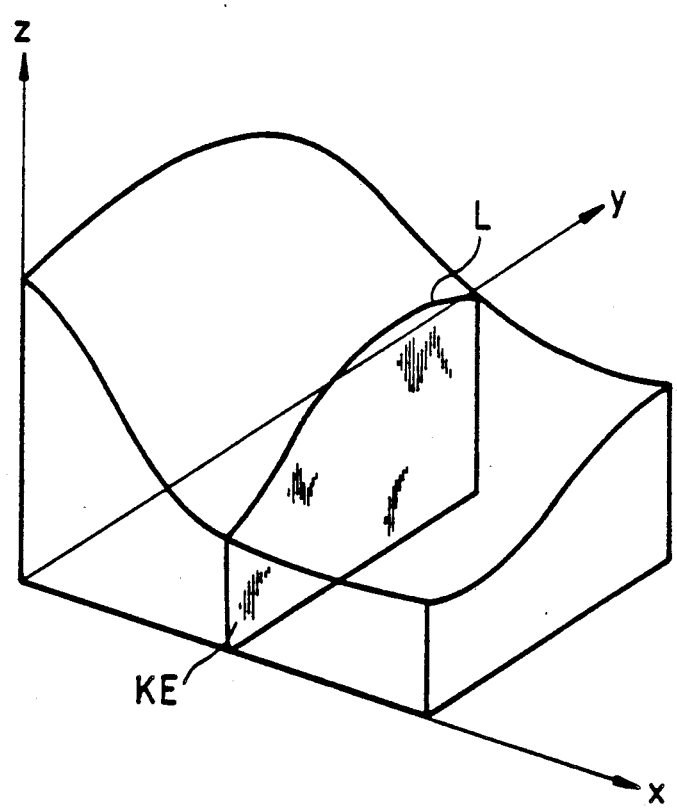
FIG. 2 schematically illustrates a spatial surface with a copying plane.

FIG. 2 illustrates a spatial surface in a cartesian coordinate system which includes the X, Y and Z axes. Surface profile lines L are generated by layering of plane sections KE. For the profile lines L to provide a complete description of the surface, an infinitely large number of plane sections KE are necessary. Generally, in the reproducing process the generation of the spatial surface is realized by detecting the profile form of a flat plane section KE which is disposed parallel to an axis. For example, during the cutting or chipping process, the velocity of the tool along the X axis remained equal to zero. Thus the surface is generated layer-wise over a finite number of sections KE, based on the real physical dimensions of the sensor T or tool F. The feed movement of the sensor T or the tool F between two planes occurs as a setting movement only after the cutting process has terminated. The principle of this technique corresponds to 2½ D-straight path control, wherein the control may be programmed in any of two axes. The plane spanned by the Y and Z axes in which the cutting movement occurs is defined here as a copying plane KE.

Figure 3:
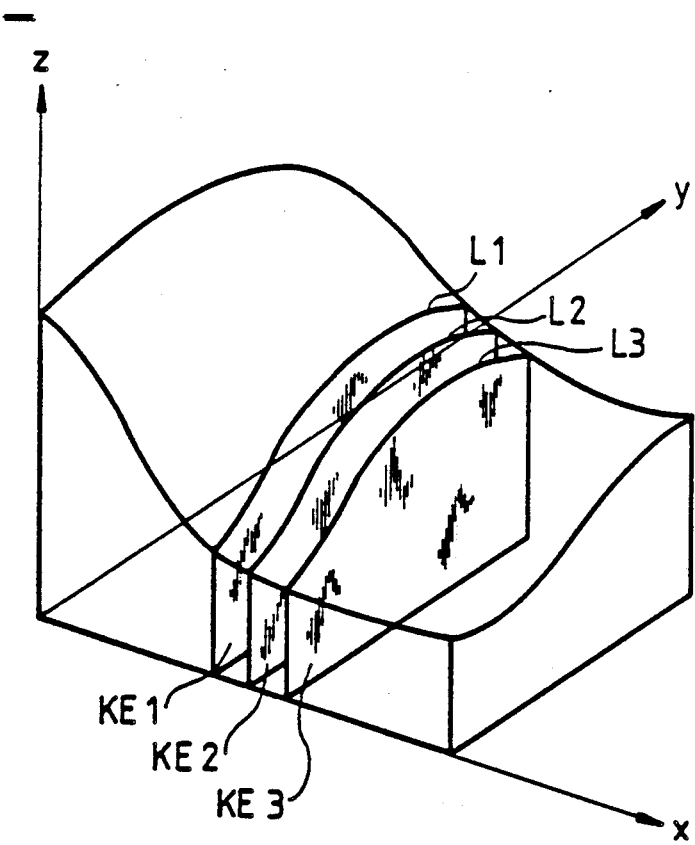
FIG. 3 schematically illustrates a spatial surface including several copying planes.

In FIG. 3 a representative example is given which illustrates three adjacent copying planes KE1, KE2 and KE3.

Figure 4:
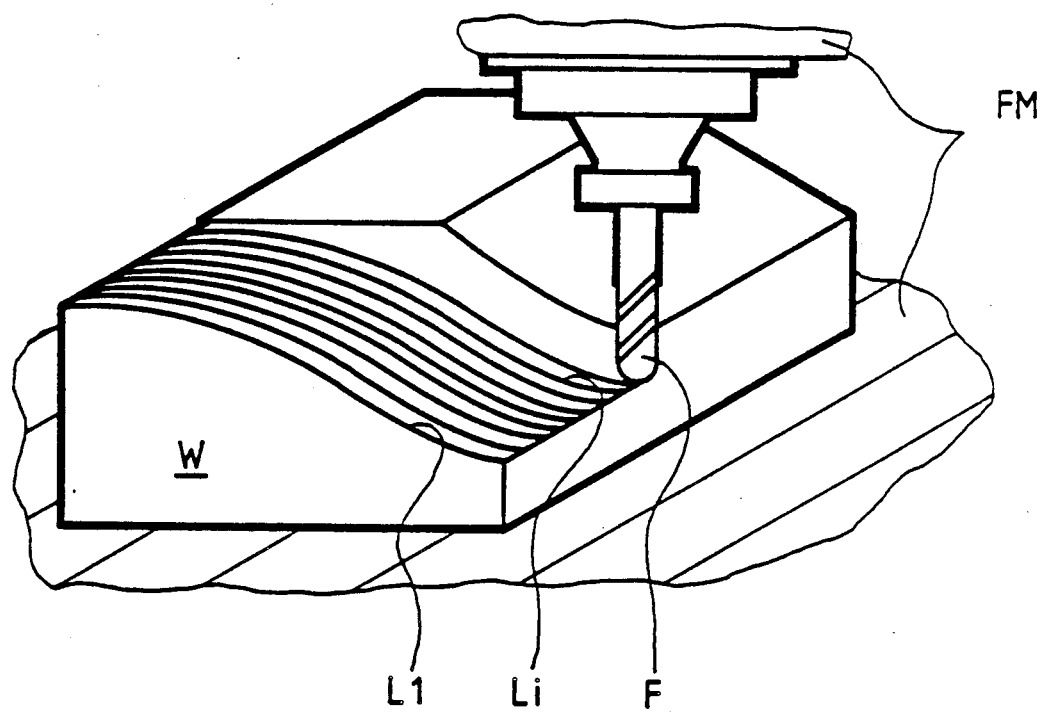
FIG. 4 schematically illustrates a prospective view of a profile cutter engaged on a surface.

Referring now to FIG. 4, the line-wise cutting process is illustrated. As will be apparent to those skilled in the art, both the scanning and the cutting process may occur in other fashions. For example, the cutting process may occur on a circular or sawtooth path. For these other cutting processes it is only necessary to obtain a sufficient amount of data.

In addition to the profile lines L, which are illustrated in FIGS. 2 and 3, a spatial surface can also be described by an infinitely large number of points which are referenced to a datum plane. Here the datum or reference plane is defined by two coordinate axes of a three-dimensional coordinate system. A value which corresponds to the height of the spatial surface from the datum plane is allocated in the third coordinate axis. In practice, a finite number of raster points are allocated to the plane spanned by the X and Y axes and then a height coordinate Z is allocated to each raster point.

Figure 5:
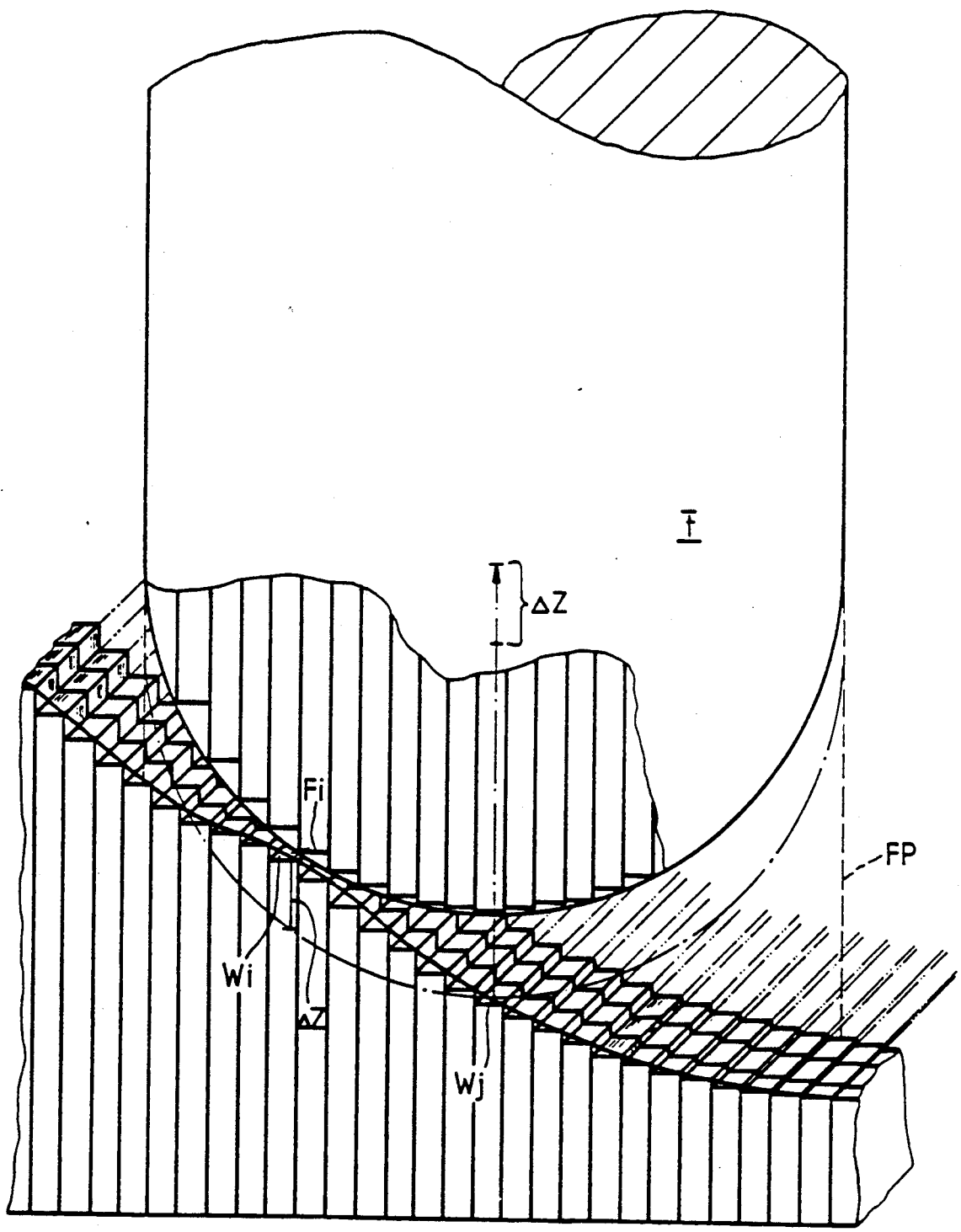
FIG. 5 illustrates an enlarged schematic representation of the profile cutter and surface.

FIG. 5 illustrates this allocation in a highly enlarged representation. The resolution, (i.e. the fineness) of the raster is governed by the specific requirements. As will be readily apparent to those skilled in the art, the resolution rises according to the number of raster points which are used.

By digitalizing each storage place of the digital memory S in the scanning of the model M, a coordinate value Z can be stored for the height of the model M in a raster which has a resolution corresponding to the resolution of the raster for the milling tool. This coordinate value is then fed to the NC-control to aid in the manufacture of the workpiece W.

As described above, because of the finite dimensions of the sensor T it is not the actual dimension of the model M that is detected, but rather the center-point path of the scanning ball of the sensor T. This center-point path of the scanning ball of the sensor T corresponds to an equidistant to the surface of the model M or of the workpiece W.

The cutting or chipping process corresponds analogously to the scanning process since both occur in a line-wise fashion. Thus, the matrix of the scanning points is formed by a number of lines and columns wherein the intersecting points of the raster and the contour elements Wi form the spatial matrix.

The numerical control NC then compares the data of the workpiece W to those of the tool F. The result of the comparison leads to relative movements between the workpiece W and the tool F. The tool F is guided according to its prescribed movement path which is determined by the dimensional data of the workpiece W and derived from the model W. The tool F is guided on the movement path such that the contour of the workpiece W is ultimately formed.

Accordingly, the cutting or chipping process occurs until a comparison between the data of the workpiece W and the tool F results in a spatial matrix which has contour elements Wk forming the surface form of the body which is to be produced.

The results of the comparison of the workpiece data and tool data are converted into control data in the form of so-called NC sets for the NC-control of the duplicating machine FM. This conversion requires the use of the individual dimensions of the particular tool F used, the sensor T, the surface of the model M and the workpiece W.

Since the data manipulation of the comparative calculation resulting at the matrix intersection points requires that the finite physical dimensions be accounted for, a collision test or consideration is performed to avoid undesired deviations in the surface form of the workpiece W. The collision consideration involves checking the data of the contour elements Wk of the matrix in the environment of the tool F to determine if there is an overlap of the relative tool data with the data of the contour elements Wk. The position of the tool is then controlled such that the contour elements Fi of the tool F and the contour elements Wi of the spatial matrix which define the surface form of the workpiece W barely touch each other.

Means are provided for determining the digital dimensional data of the workpiece W and comparing this data directly with the digital dimensional data of tool F to determine the point nearest the milling tool and the desired surface of the workpiece.

Alternatively, the relevant data may be determined by performing a "height comparison" between the data of the spatial matrix of the workpiece W and the data of a projection of the tool F onto the workpiece W. In this preferred embodiment, the surface of the tool is projected onto the surface of the workpiece. The height of the contour elements (Wk,Fk) are compared to determine if within the projection surface (FP) of the tool (F) there are contour elements (Wi) which are higher than the contour elements (Wj) of the surface of the workpiece W which is to be momentarily generated. Here the term "higher than the contour elements of the surface" refers to contour elements above or within the projection surface. If it is determined that in the momentary path of the tool (F) the contour elements (Wi) are higher than the contour elements (Wj) of the surface which is to be momentarily generated by the tool (F), correction movements ($\Delta Z$) are superposed on the positioning movements of the tool (F). The terms "surface to be momentarily generated" and "momentary movement path of the tool (F)" refer here to the surface which is to be generated and movement path without the correction movements, respectively. The position of the tool F is therefore governed not only by the desired surface of the workpiece W but also by determining whether a contour rise is present in the immediate neighborhood of the tool F. This control rise is perceived and the positioning of the tool is governed in such a way that the tool F barely touches this rise.

In a preferred embodiment, which provides a particularly advantageous manner of determining the correction data for the milling tool center path, the spatial matrix is comprised of uniformly spaced lines and columns. In this manner each contour element Wk in the fixed raster is allocated with one X-coordinate and one Y-coordinate. The surface contour of the workpiece W is thus represented by a plurality of height coordinates Z with determined numerical values at the respective address X/Y.

In this latter case with the fixed assignment of the raster to the matrix, the cutting or chipping process can be controlled in such a manner that each line of the matrix corresponds to an advance line of the line-wise processing. This embodiment avoids the need to check each contour element (Wk, Fk) within the tool projection in the collision test. It is sufficient to check the contour elements that lie in the column of the matrix which runs perpendicular to the tool axis. This requires that an equidistant be determined to the profile line of the line which is to be momentarily processed. This measure considerably reduces the amount of data which must be compared.

The foregoing description of the preferred embodiments of the present invention has been presented for purposes of illustration and description. They are not intended to be exhaustive or to limit the invention to the precise forms disclosed, and obviously many modifications and variations are possible in light of the above teachings. It is intended that the scope of the invention be defined by the following claims, including all equivalents.

I claim:

1. In an apparatus for producing a workpiece having a correct workpiece surface, the apparatus including a storage medium and a duplicating machine, the duplicating machine having a numerical control and a processing tool having a movement path, wherein data relating to the position and the dimensions of the workpiece and data relating to the movement path and dimensions of the tool are deposited in the storage medium and stored as contour elements of a spatial matrix, and wherein the numerical control includes means for comparing the data relating to the workpiece and the tool and generating a control signal in response to the comparison, the control signal controlling positioning movements between the workpiece and the tool, which movements determine the surface form of the workpiece, the improvement comprising:

means for performing a collision test and providing correction movements comprising means for projecting the surface of the tool onto the surface of the workpiece; comparing the height data of the contour elements of the tool and of the workpiece within the projection surface of the tool; and superposing correction movements on the positioning movements if the comparison of the height data yields that in the path of movement of the tool, contour elements of the correct workpiece surface are higher than the contour elements which are to be momentarily generated without the correction factor.

2. The apparatus of claim 1 wherein:

the spatial matrix provides an equidistant raster of lines and columns;

the workpiece processing by the tool is performed in lines, the lines in the workpiece processing being directly related to the spacing of the matrix lines; and within the projection surface of the tool only the contour elements that lie in the column of the matrix which is perpendicular to the tool axis are subjected to a collision test.

3. The apparatus of claim 2 wherein the correction movements are such that the contour elements of the tool and the contour elements of the correct workpiece surface barely touch.

4. In an apparatus for producing a workpiece having a correct workpiece surface, the apparatus including a storage medium and a duplicating machine, the duplicating machine having a numerical control and a processing tool having a movement path controlled by a signal from the numerical control, wherein data relating to the position and the dimensions of the workpiece and data of the movement path and dimensions of the tool are deposited in the storage medium and stored as contour elements of a spatial matrix, and wherein the numerical control includes means for comparing the data relating to the workpiece and the tool and generating a control signal in response to the comparison, the control signal controlling positioning movements between the workpiece and the tool, which movements determine the surface form of the workpiece, the improvement comprising:

means for projecting the surface of the tool onto the surface of the workpiece in the momentary movement path of the tool;

means for determining whether, in the momentary movement path of the tool, contour elements of the correct surface of the workpiece are higher than the contour elements of the surface which is to be momentarily generated by the tool; and means for providing a correction signal to the numerical control wherein the correction signal is superposed on the positioning signal for the tool.

5. The apparatus of claim 4 wherein the numerical control provides programmed control along two axes and the movement path of the tool occurs in a line-wise manner along a plurality of advance lines.

6. The apparatus of claim 4 wherein the correction signal is such that the contour elements of the tool and the contour elements of the correct workpiece surface barely touch.

7. The apparatus of claim 4 wherein:
the spatial matrix provides an equidistant raster of lines and columns;
the workpiece processing by the tool is performed in lines, the lines in the workpiece processing being directly related to the spacing of the matrix lines; and
the height of only the contour elements that lie in the column of the matrix which is perpendicular to the tool axis within the projection surface of the tool are compared.

* * * * *